(12) United States Patent
Brinkhuis et al.

(10) Patent No.: US 6,872,789 B2
(45) Date of Patent: Mar. 29, 2005

(54) CROSS-LINKABLE POLYMER COMPOSITION

(75) Inventors: Richard Hendrikus Gerrit Brinkhuis, Zwolle (NL); Andreas Henricus Johannes Roelofs, Arnhem (NL); Dirk Emiel Paula Mestach, Nijlen (BE); Petrus Johannes Maria David Elfrink, Boxmeer (NL); Wincently Lambertus Stanislaw Pilaszek, Tholen (NL); Hendrik Hermanus Rikus van der Horst, Oss (NL)

(73) Assignee: Akzo Nobel N.V., Arnehm (NL)

( * ) Notice: Subject to any disclaimer, the term of this patent is extended or adjusted under 35 U.S.C. 154(b) by 29 days.

(21) Appl. No.: 10/289,707

(22) Filed: Nov. 7, 2002

(65) Prior Publication Data

US 2003/0153676 A1 Aug. 14, 2003

Related U.S. Application Data

(60) Provisional application No. 60/361,182, filed on Mar. 1, 2002.

(30) Foreign Application Priority Data

Nov. 7, 2001 (EP) .......................................... 01204311

(51) Int. Cl.$^7$ ................................................ C08F 4/00
(52) U.S. Cl. ............................ 526/89; 526/78; 526/79; 526/81; 526/75; 526/80; 526/317.1
(58) Field of Search ............................ 526/89, 78, 79, 526/81, 75, 80, 317.1, 377, 215, 201, 213, 206; 524/458, 460, 828, 832, 833; 523/332, 335

(56) References Cited

U.S. PATENT DOCUMENTS

| | | | |
|---|---|---|---|
| 3,813,254 A | 5/1974 | Makhlouf | 117/12 |
| 4,680,352 A | 7/1987 | Janowicz et al. | 526/147 |
| 4,722,984 A | 2/1988 | Janowicz | 526/123 |
| 4,808,656 A | 2/1989 | Kania et al. | 524/512 |
| 5,371,151 A | 12/1994 | Berge et al. | 525/377 |
| 5,444,118 A | 8/1995 | Tsuruoka et al. | 524/828 |
| 5,637,644 A * | 6/1997 | Tsuruoka et al. | 524/828 |
| 5,665,434 A | 9/1997 | Mass et al. | 427/393.5 |
| 5,708,095 A | 1/1998 | Grezzo Page et al. | 525/301 |
| 5,710,227 A | 1/1998 | Freeman et al. | 526/208 |
| 5,804,632 A * | 9/1998 | Haddleton et al. | 524/458 |
| 5,928,829 A * | 7/1999 | Cheng et al. | 430/137.17 |
| 6,017,992 A | 1/2000 | Haddleton et al. | 524/458 |
| 6,258,504 B1 * | 7/2001 | Bartus et al. | 430/137.17 |
| 6,476,108 B1 * | 11/2002 | Mogi et al. | 524/247 |
| 6,492,446 B1 * | 12/2002 | Kajiwara et al. | 524/157 |
| 2002/0082374 A1 * | 6/2002 | Schaedler et al. | 526/317.1 |

FOREIGN PATENT DOCUMENTS

| | | | |
|---|---|---|---|
| EP | 0 587 333 B1 | 3/1994 | C08F/265/06 |
| EP | 0 661 320 B1 | 7/1995 | C08G/18/62 |
| EP | 0 989 163 A1 | 3/2000 | C08L/101/06 |
| GB | 1107249 | 3/1968 | C08F/19/00 |
| JP | 61-155413 | 7/1986 | C08F/255/02 |
| JP | 7-189190 | 7/1995 | D21H/19/56 |
| JP | 7-316212 | 12/1995 | |
| WO | WO 95/29944 | 11/1995 | C08F/265/04 |
| WO | WO 00/05272 | 2/2000 | C08F/2/00 |

OTHER PUBLICATIONS

European Search Report No. EP 01 20 4311 dated May 2, 2002.
Derwent Abstract 1986–247671 abstracting JP 61–155413.
Patent Abstracts of Japan abstracting JP 61–155413 (1986).
Derwent Abstract 1995–291116 with computer translation of JP 7–189190 from the Japanese Patent office website.
Derwent Abstract 1996–055995 with computer translation of JP 7–316212 from the Japanese Patent office website.
Duck, E. W., "Emulsion Polymerization," Encyclopedia of Polymer Science and Technology, 1966, 5, pp. 801–859.
Asua, J. M. et al., "Reactive surfactants in heterophase polymerization," Acta Polym., 1998, 49, pp. 671–686.
Webster, O. W., "Living Polymerization Methods," Science, 1991, 251, pp. 887–893.

* cited by examiner

Primary Examiner—Tatyana Zalukaeva
(74) Attorney, Agent, or Firm—Michelle J. Burke; Richard P. Fennelly

(57) ABSTRACT

The invention pertains to a polymer obtainable from the steps:
  polymerizing a mixture, that is substantially free or organic solvents, of ethylenically unsaturated monomers which consist for at least 70% of methacrylates, and which comprises specific chain transfer agents, α-methylstyrene dimer being preferred, to form a first polymer,
  aqueous emulsion polymerizing a mixture comprising ethylenically unsaturated monomers in the presence of the first polymer to form a dispersion of a water-insoluble second polymer, wherein these steps are preferably performed in the absence or the substantial absence of a surfactant.

9 Claims, No Drawings

CROSS-LINKABLE POLYMER COMPOSITION

This application claims priority of European Patent Application No. 01204311.3, filed Nov. 7, 2001, and U.S. Provisional Patent Application No. 60/361,182, filed Mar. 1, 2002.

FIELD OF THE INVENTION

The invention pertains to a cross-linkable polymer and the synthesis thereof. The invention further pertains to a coating composition comprising said cross-linkable polymer.

BACKGROUND OF THE INVENTION

Due to increasingly stringent laws on the maximum allowable amount of volatile organic compounds in coating compositions, major efforts have been made to minimize the use of organic co-solvents in water borne coatings based on acrylic binders. In water borne coating compositions that use dispersions of acrylic polymers as the main binder, the final hardness after curing of an applied coating film is related to the glass transition temperature of the acrylic polymer. A high glass transition temperature of the polymer however means that substantial amounts of organic co-solvent must be used to reduce the minimum film formation temperature in order to ensure proper coalescence of the polymer particles. Since many final coatings require a minimum hardness, for example if a high blocking resistance or scratch resistance is important, and in view of the desire to reduce the amount of volatile organic compounds, improved coating compositions are needed.

It is known that the hardness of a coating can be increased by introducing a cross-linking mechanism in the coating. In coating applications one- (1K) and two-package (2K) systems are commonly used. In order to obtain cross-links in the final coating, various possibilities have been proposed, inter alia depending on the system that is used. More particularly, in a one-package system, the acrylic resins are typically combined with the cross-linker within a single package with curing occurring at ambient temperature or by baking the coating after application. In a two-package (2K) system, the acrylic polymer is typically separated from the cross-linker. Prior to application, the contents of the two packages are combined, and curing occurs through chemical cross-linking reactions.

It should be noted that the conventional polymer compositions for water borne coating compositions are typically supplied as aqueous dispersions. Such aqueous dispersions are conveniently prepared by means of an emulsion polymerization process. Hence, also the polymer compositions according to the invention are preferably aqueous polymer dispersions that are suitably produced using such an emulsion polymerization process. The aqueous polymer dispersions that are being used as binders in these coatings are often prepared by means of the emulsion polymerization process. A general description of the emulsion polymerization process is given E. W. Duck in Encyclopedia of Polymer Science and Technology, 1966, John Wiley & Sons, Inc., Vol 5, p 801–859. A serious drawback to the conventional emulsion polymerization process is the fact that substantial amounts of protective colloids and surfactants must be used. Surfactants are low molecular weight amphiphilic compounds possessing a hydrophilic and a hydrophobic moiety. The amounts used are in general above the critical micelle concentration for the surfactant used. Surfactants perform many functions in emulsion polymerization, including solubilizing hydrophobic monomers, determining the number and the size of the dispersion particles formed, providing dispersion stability as particles grow, and providing dispersion stability during post-polymerization processing. Typical examples of surfactants used in emulsion polymerizations are anionic surfactants, such as fatty acid soaps, alkyl carboxylates, alkyl sulfates, and alkyl sulfonates, and nonionic surfactants, such as ethoxylated alkylphenol or fatty acids used to improve freeze-thaw and shear stability. Cationic surfactants derived from amines, nitrites, and other nitrogen bases, are rarely used because of incompatibility problems. Often a combination of anionic surfactants or anionic and nonionic surfactants is used to provide improved stability.

Conventional surfactants (also known as emulsifiers) are highly water sensitive and impart poor water resistance to the final coating compositions comprising them. Furthermore surfactants or emulsifiers often act as plasticizer for the polymers resulting in reduced properties such as surface hardness, blocking resistance and chemical resistance. Another problem that might occur is the tendency for surfactant molecules to migrate to the polymer/air or polymer/substrate interface, where deleterious effects (cloudiness at the surface, loss of tack, etc.) are often caused. Recently a number of products have come onto the market, known as "polymerizable surfactants", where the molecule contains a polymerizable ethylenically unsaturated double bond. An example of the use of such a compound is given in European Patent Application EP-A-1042370. The surfactant becomes bound to the main polymer during the emulsion polymerization. However, it is hard to obtain full conversion of these reactive surfactants. A comprehensive review on this subject is given by Asua et al. (*Acta Polym.,* 1998, 49, 671). The non-converted polymerizable surfactant will behave in a way that is similar to conventional surfactants and hence will also negatively influence the application properties.

An alternative for low molecular weight surfactants is the use of polymeric surfactants. In GB-A-1,107,249 an emulsion polymerization process is described where a styrene/acrylic acid resin prepared by solution polymerization in the presence of a chain transfer agent, having an acid value of about 169 and a molecular weight of about 2100, was used, after neutralization, as a polymeric surfactant for an emulsion polymerization. The drawback of polymer dispersions thus made is that the polymeric stabilizer is not covalently bound to the polymer dispersion particles. As a result the resistance against water and alkaline solutions of the final coating is very poor. A solution to this problem is known from PCT patent application WO-A-95/29944. This patent application discloses a process for the production of an aqueous polymer composition for use as a coating with improved hardness and low film forming temperature. Use is made of a cross-linking agent that links a first, water-soluble polymer with a second, hydrophobic polymer. The cross-linking agent reacts by condensation. The lower the water concentration, the more this reaction takes place. It was found that the cross-linking reaction proceeds relatively slowly and begins only after evaporation of all the water from the film. As a result, the early hardness and water resistance of the final coating are relatively low.

European patent application EP-A-0,587,333 discloses a water-resistant polymer dispersion containing a carboxylated water-soluble polymer that is neutralized and solubilized with, e.g., ammonia. An alkali-insoluble emulsion polymer was prepared in the presence of the water-soluble first polymer. During preparation, the two polymers are grafted together. The alkali-insoluble polymer can have amine functionality. The composition can comprise a water-soluble polymer with an amine functionality, which serves to neutralize the soluble polymer, as an alternative for the ammonia. Metal ions may be incorporated into the monomer mixture so as to create ionic metal/carboxylate cross-links.

The water-soluble stage polymer remains susceptible to bases, which may cause resolubilization when a second layer of paint is applied. The hydrophobic polymer remains thermoplastic and does not cross-link, so that the resulting coating film shows a limited hardness after application. A common problem with aqueous polymer compositions comprising polymer dispersions with polymers having substantial amounts of carboxylic acid-functional groups, is their poor water resistance and poor re-coatability, since the water-soluble polymer will easily be affected in the presence of water or, when a second layer of water borne paint is applied, under the influence of the neutralizing base present. Also the resulting coatings suffer from a bad chemical resistance.

In European patent application EP-A-0,989,163 a solution is proposed to solve these problems. The water-soluble first stage polymer has carbonyl functionality, so that it can be cross-linked by means of a co-reactive compound. Additionally, an amine-functional water-soluble third polymer was included in the composition to form ionic cross-links with the acid-functional groups in the polymer. However, even though the polymer dispersions described in this patent give significantly improved properties compared to the prior art, some properties still are inadequate. It was found that these deficiencies are caused because only about 50% of the water-soluble first stage polymer was permanently attached to the substantially water-insoluble second polymer. The water-soluble polymer can be permanently attached by entanglement or by chemical grafting through proton abstraction. The degree of attachment can be determined by means of techniques such as ultracentrifugation of the polymer dispersion and analysis of the solids content of the supernatant.

It is to be expected that the degree of attachment of the water-soluble polymer will be increased by the introduction of a co-polymerizable ethylenical unsaturation at one end of the polymer chain. Hence, unsaturated chain transfer agents such as mercapto-olefins may be used, as these will introduce unsaturation into the oligomer.

Alternatively, various living polymerization methods have been disclosed for obtaining functional-ended polymers by selective termination of living ends. Such functional-ended polymers can subsequently be attached to another polymer, that is, as so-called macromonomer "arms" on a polymeric backbone to form a comb graft copolymer. Webster, in *Living Polymerization Methods,* 251 *Science* 887 (22, Feb. 1991) generally discloses living polymerization methods for preparing architectural forms of polymers, including graft and comb copolymers. Living polymerization methods suffer from a lot of disadvantages, not the least being the susceptibility to contaminants.

An alternative for living polymerization methods in the production of macromonomers was described in U.S. Pat. No. 5,710,227 wherein a high temperature polymerization process was used for making terminally unsaturated oligomers. This polymerization has to be conducted at above 225° C. to produce polymers having a degree of polymerization that is sufficiently low. This is not only undesirably energy intensive, but also causes degradation of some functional monomers that are needed for cross-linking. In patent application WO-A-00/05272 the macromonomers described above are used as polymeric stabilizers in an emulsion polymerization process. However also in this case, conventional low molecular weight surfactant has to be used in the polymerization recipe to control particle size.

U.S. Pat. Nos. 4,680,352 and 4,722,984 disclose the use of cobalt (Co) chelates as chain transfer agents in free-radical polymerization. The latter patent discloses that macromonomers prepared by cobalt chain transfer can be polymerized to produce graft copolymers which are useful in coatings. In U.S. Pat. No. 6,017,992 a process for the production of an aqueous polymer emulsion is described which comprises the preparation of a low molecular weight polymer containing acid-functional groups using a free-radical polymerization process which employs a free-radical initiator and a transition metal chelate complex, particularly a cobalt chelate complex. This mode of operation produces polymers with number average molecular weights within the range of 500 to 50,000 and a terminal $\alpha$-substituted acrylate group. A drawback to this process is that the end product contains cobalt, which is undesirable from an environmental point of view. Furthermore conventional low molecular weight surfactant is needed to control particle size.

It is an object of the present invention to find specific polymer compositions, which can be used as a binder in water borne coating compositions with a low content of volatile organic compounds, a process to make them that is devoid of the above disadvantages, and coating compositions comprising said polymer compositions that show good film formation, fast hardness development, and good chemical resistance.

SUMMARY OF THE INVENTION

A conventional free-radical polymerization process has now been found wherein at least 70% by weight of all ethylenically unsaturated double bonds are methacrylic and wherein $\alpha$-methyl styrene dimer is used as a chain transfer agent results in the production of oligomers with a desired molecular weight, and with a terminal ethylenically unsaturated bond that can participate in a subsequent graft polymerization reaction in an emulsion polymerization step. Surprisingly, this emulsion polymerization can be performed without conventional low molecular weight surfactants, while no undesired aggregates are formed. The resulting aqueous polymer dispersions are suitable for use in coating compositions, printing inks, and adhesives. Accordingly, a preferred embodiment of the present invention relates to specific surfactant-free polymer compositions which can be used as a surfactant-free binder in water borne coating compositions with a low content of volatile organic compounds, a process to make them, and coating compositions comprising the polymer compositions that show good film formation, fast hardness development, and good chemical resistance.

A significant advantage of this invention is that the use of cobalt chelate complexes as used in U.S. Pat. Nos. 4,680,352 and 4,722,984 is avoided. As a result the final coating composition will not comprise cobalt or other transition metals that can be used in catalytic chain transfer polymerizations. Since the present invention can be practiced without the use of chelates of transition metals with catalytic chain transfer activity, it is another preferred embodiment to make and use polymer compositions that are free of these transition metals.

DETAILED DESCRIPTION OF THE INVENTION

The invention therefore pertains to a polymer obtainable from the steps of a) polymerizing a mixture of ethylenically unsaturated monomers, at least 70% of all ethylenically unsaturated bonds of the monomers being of a methacrylic nature, in the presence of one or more chain transfer agents of the formula

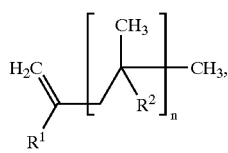

wherein $R^1$ and each of $R^2$ are the same or different and are independently selected from conventional radical stabilizing groups, being conventional groups that stabilize a radical formed on the carbon atom to which the group is attached, preferably selected from the group consisting of alkyl; substituted alkyl; nitril; hydrocarbylester, such as (meth) acrylic esters; urethanes; amides, such as (meth) acrylamides; optionally substituted, saturated or aromatic carbocyclic or heterocyclic rings, such as phenyl, halogen; and a polymer chain, n ranging, on average, from 0 to 10, to form a first polymer with unsaturated carbon-carbon end groups, that is essentially free of organic solvents, the monomers being selected such that the first polymer is water-soluble or water-dispersible. In the latter case the polymer may form colloidally stable polymer particles without the need for conventional low molecular weight surfactant when dispersed in an aqueous medium and b) emulsion polymerizing a mixture comprising ethylenically unsaturated monomers in the presence of the first polymer to form a dispersion of a water-insoluble second polymer. Water-insoluble means that the concentration of the second stage polymer in the continuous phase under the polymerization conditions used is below 25% by weight. Preferably step b) is surfactant-free. The chain transfer agent is preferably selected from compounds wherein $R^1$ and $R^2$ are the same or different and are selected from the group consisting of alkyl, and saturated or aromatic carbocyclic or heterocyclic ring structures. More preferably, $R^1$ is the same as $R^2$ and selected from aromatic moieties. The most preferred chain transfer agent is α-methylstyrene dimer of the formula

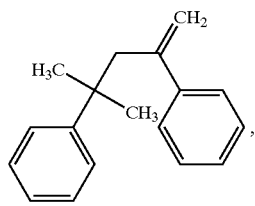

which is commercially available. Depending on the molecular weight of the compound and its chain transfer activity, the amount of chain transfer agent(s) that is used in the process can vary over a wide range, e.g. of from 0.05% to 50% by weight, based on the weight of the monomers. For chain transfer agents with a molecular weight below 500 Dalton, which are preferred for ease of handling, the amount used typically ranges from 0.05 to 15% by weight, based on the weight of all monomers. For the most preferred compound α-methylstyrene dimer the amount used preferably is from 0.1 to 10% by weight, based on the weight of all monomer. If so desired, the chain transfer agents according to the invention can be combined with one or more additional conventional chain transfer agents.

Preferably at least 75%, more preferably at least 80%, most preferably at least 85% of all ethylenically unsaturated bonds of the monomers of step a) are of a methacrylic nature.

The invention further pertains to a synthesis of the above composition by performing the above steps, as well as to the use of the resulting polymer composition in a coating, an adhesive or a printing ink composition.

In order for the polymer composition to have a sufficient cross-linking capacity, it is preferred that one or more of the monomers used in step a) and/or b) comprise cross-linkable groups. Preferably, such cross-linkable groups are selected from: hydroxyl groups, acid groups, aldehyde or carbonyl groups, amine groups and oxirane groups. Preferably, at least one monomer with cross-linkable groups is used in step a). More preferably, a monomer with cross-linkable group is used in both steps a) and b). Even more preferably, these functional groups are derived from esters or amides of methacrylic acid. Most preferably the monomer mixture to make the first polymer comprises at least 70 mole % of methacrylic acid, esters and/or amides thereof. It is possible to use more than one kind of monomer with cross-linkable groups.

For the production of the preferred surfactant-free polymer compositions it was found that acid- and amide-functional monomers also assist in stabilizing the droplets and/or particles of the aqueous dispersion. Hence for such processes it is also preferred that one or more of these monomers is copolymerized.

The preparation of the first polymer in step a), which is water-soluble or water-dispersible, can be carried out using conventional techniques, such as solution polymerization, bulk polymerization, or emulsion polymerization.

The polymer from the first step (i.e., step a) is essentially free of organic solvents, i.e. comprise less than 10 wt. %, preferably less than 5 wt. %, more preferably less than 1 wt. % and most preferably less than 0.01 wt. % of organic solvents. Preferably this is achieved by not using solvents in the first polymerization step. However, if so desired, the first step can be conducted in the presence of a solvent, if it also includes a solvent removal step. The solvent removal step can optionally be performed after the polymerization of the second polymer.

The first step (i.e., step a) and second step (i.e., step b) are each preferably performed in the absence or substantially in the absence of surfactants. Thus, the final composition of the second step comprises less than 1 wt. % of surfactant, preferably less than 0.5 wt. %, and most preferably less than 0.01 wt. % of surfactant.

The number average molecular weight of the first polymer, preferably is between 750 and 15,000, more preferably between 1,000 and 10,000. A preferred first polymer contains acid groups such that the acid value is between 0 and 200 mg KOH/g, preferably between 10 and 150 mg KOH/g.

Examples of ethylenically unsaturated monomers that can be used in the process of the invention include mono vinylidene aromatic monomers, alpha-beta ethylenically-unsaturated carboxylic acid ester monomers, vinyl ester monomers, and various combinations of these. Preferably they are selected from the group consisting of esters of acrylic and methacrylic acid such as n-butyl (meth)acrylate, methyl(meth)acrylate, ethyl(meth)acrylate, 2-ethylhexyl (meth)acrylate, cycloalkyl(meth)acrylates, such as isobornyl (meth)acrylate and cyclohexyl(meth)acrylate, styrene, i.e., styrene or substituted styrenes, for instance α-methyl styrene or t-butyl styrene; vinyl toluene; dienes such as 1,3-butadiene or isoprene; and mixtures thereof. Also vinyl esters, such as vinyl acetate, vinyl alkanoate or their derivatives or mixtures thereof can be used in the monomer composition. Nitriles, such as (meth)acrylonitrile, or olefinically unsaturated halides, such as vinyl chloride, vinylidene chloride, and vinyl fluoride can also be used. Preferred vinyl ester monomers include vinyl acetate, vinyl esters of versatic acid such as the monomers commercialized by Shell Chemicals under the trade names VEOVA™ 9, 10 and 11).

Unsaturated monomers with acid functionality, which include monomers of which the acid groups are latent as, for example, in maleic anhydride, are suitably selected from, but not limited to: acrylic acid, methacrylic acid, oligomerized acrylic acids such as β-carboxyethyl acrylate or its higher analogues (commercially available from Rhodia as Sipomer® B-CEA), itaconic acid, fumaric acid, maleic acid, citraconic acid, or the anhydrides thereof, styrene p-sulphonic acid, ethylmethacrylate-2-sulfonic acid and 2-acrylamido-2-methylpropane sulfonic acid. An acid bearing monomer could be polymerized as the free acid or as a salt, e.g. the $NH_4$ or alkali metal salts. Amide-functional comonomers include, but are not limited to, acrylamide and methacrylamide.

Monomers with other cross-link functionality can be selected from, but are not limited to, i) amine-functional monomers, such as dimethylaminoethyl (meth)acrylate and tertiary-butyl aminoethyl (meth)acrylate, ii) hydroxy functional monomers, such as hydroxyethyl methacrylate, hydroxyethyl acrylate, hydroxypropyl acrylate, hydroxypropyl methacrylate, hydroxybutyl acrylate, and the like, as well as alkoxylated hydroxy-functional monomers, and monomers having latent hydroxy groups, such as glycidyl (meth)acrylate, iii) ketone or aldehyde-functional monomers, such as the acetoacetoxy esters of hydroxyalkyl acrylates and methacrylates, such as acetoacetoxyethyl (meth)acrylate, acetoacetoxy ethyl(meth)acrylamide, and keto-comprising amides such as diacetone(meth) acrylamide, (meth)acrolein, formyl styrene, 2-hydroxyethyl methacrylate acetoacetate, 2-hydroxypropyl acrylate acetyl acetate, butanediol-1,4 acrylate acetyl acetate, or a vinyl alkyl ketone, e.g., vinyl methyl ketone, vinyl ethyl ketone or vinyl butyl ketone, iv) urea, such as ethylene ureidofunctional monomers such as N-(2-methacryloyloxethyl) ethylene urea, and v) oxirane functional monomers such as glycidyl(meth)acrylate, allyl 2,3-epoxypropyl ether and allyl 2,3-epoxypropyl phthalate.

For coating compositions comprising the present polymer composition it is preferred to introduce cross-links during the drying step of the coating. To achieve this, it is preferred to use a cross-linking agent which reacts with the preferred cross-link functional groups of the polymer, which were incorporated in step a) or b) of the process according to the invention. The cross-linking agent can be added to the polymer composition after the emulsion polymerization step b), if the choice is made to react it with the cross-link functional groups of the polymer upon drying of the coating composition (e.g. due to the evaporation of the water in the formulation). In this way attractive 1K ambient temperature curing systems can be produced. However, the cross-linking agent can also be added to the coating composition, at a later stage, such as during the formulation of the final coating composition as is the case with amino-cross-linkers that form cross-links upon stoving of the paint after it has been applied to the substrate. In another embodiment, where very reactive cross-linkers are being used such as polyisocyantes, that will immediately start reacting with the cross-linkable groups, the cross-linker is added to the paint prior to application as is typically done for 2K systems. In a preferred embodiment the cross-linking agent is added just prior to the application of the coating composition to the substrate.

The selection of the cross-linking compound that is added to the polymer dispersion and that can react with the functional group of the polymer depends on the chemical nature of this group. This compound can be either a polymeric or a low-molecular weight compound. In order to effect cross-linking, the cross-linking compound must possess at least two co-reactive groups. Examples of suitable co-reactive groups for given pendant functional groups are known to those skilled in the art. Non-limiting examples are given in Table I.

TABLE I

| Reactive group | Co-reactive groups |
| --- | --- |
| Amine | oxirane, isocyanate, ketone, aldehyde, acetoacetoxy |
| Hydroxy | Methylol, etherified methylol, isocyanate, aldehyde |
| Ketone, including acetoacetoxy | Amino, hydrazide, aldehyde |
| Aldehyde | Amino, hydrazide |
| Urea | Glyoxal |
| Oxirane | Carboxylic acid, amino, thiol |

The first polymer can be synthesized by free radical bulk or solution techniques. When an organic solvent is used in the process it can be removed by distillation. The first polymer can suitably be synthesized by a suspension or emulsion polymerization using water as the polymerization medium.

If the first polymer is synthesized by solution of bulk polymerization, suitable polymerization initiators can be added, such as azo initiators, organic peroxides and hydroperoxides. Typical initiators are dialkylperoxides, such as di-tertiary butyl peroxide, di-cumyl peroxide, and tertiary amyl peroxide; peresters such as amyl peroxyacetate t-butyl perpivalate, and percarbonates; peroxydicarbonates such as di(n-propyl) peroxydicarbonate, bis(2-ethylhexyl) peroxydicarbonate, and di-n-butyl peroxydicarbonate; diacylperoxides, such as dibenzoyl peroxide and dilauroyl peroxide; perketals; hydroperoxides, such as t-butyl hydroperoxide, and cumene hydroperoxide; and azo initiators, such as 2,2'-azobisisobutyro nitrile, 2,2'-azobis-2-methyl butyronitrile, 2,2'-azobis(2,4-dimethyl pentane nitrile), 2,2'-azobis(2-methyl propane nitrile), 2,2'-azobis(2-methyl butane nitrile), 1,1'-azo(cyclohexane carbonitrile) and 4,4'-azobis(4-cyanopentanoic)acid. The azo initiators are preferred. If the first polymer is made by emulsion polymerization, free radical initiators such as sodium, potassium, or ammonium persulfate, watersoluble azo-iniutiators and hydroperoxides can be used. Reducing agents can be used in combination with the initiators to obtain a radical flux sufficient to perform the polymerization of the first polymer at lower temperatures. These reducing agents include but are not limited to ascorbic acid, sodium formaldehyde sulfoxylate, sodium metabisulfite thiosulfates, disulfates and hydrosulfates. If desired they can be used in combination with reducing salts, such as iron sulfate.

Typically the initiators are used in an amount of from 0.5 to 5% by weight of the monomers.

The free radical polymerization is usually performed at the reflux temperature of the reaction mixture in the temperature range between 70 and 175° C. For the aqueous polymerization technique conventional reaction conditions are applied. Typically the polymerization temperatures ranges from 20 to 120° C.

After the copolymerization has come to an end, the acid-functional groups, if present, are preferably (partially) neutralized with a base. When the first polymer is prepared by solution polymerization water is added to the first polymer (or vice versa) to yield an aqueous solution, dispersion, or emulsion. When the first polymer is prepared by means of emulsion polymerization, the dispersion after adjustment of the pH can be used as such in the next step.

The neutralizing agent can be either an organic or an inorganic base. Preferably, the neutralizing agent is a volatile base such as ammonia. Other possible bases are, for example, volatile amines, such as amino methyl propanol, dimethyl ethanolamine or 2-dimethylamino-2-methyl-1-propanol, triethyl amine or monoethanol amine. Optionally, a blend of different volatile bases may be used.

The water-insoluble second polymer may be a homo- or copolymer prepared by emulsion polymerization in the presence of the first polymer using esters of acrylic or methacrylic acid such as methyl (metha)crylate, ethyl (meth) acrylate, butyl (meth)acrylate, 2-ethylhexyl (meth)acrylate, isobornyl (meth)acrylate, cyclohexyl (meth)acrylate or an ethylenically unsaturated compound such as styrene, vinyl toluene or α-methyl styrene, o-, m-, and p-methylstyrene, o-, m-, and p-ethylstyrene, p-chlorostyrene, and p-bromostyrene. Also vinyl esters such as vinyl alkanoates and vinyl acetate and its derivatives; vinyl halides such as vinyl chloride; vinylidene halides such as vinylidene chloride; dienes such as 1,3-butadiene, and isoprene vinyl acetate can be used in the monomer composition. The monomer composition can also contain carboxylic acid-functional monomers such as acrylic and methacrylic acid and monomers possessing a second functional group such as amino or ethylene ureido groups. The functional groups for cross-linking that are optionally present in the second polymer can but are not necessarily the same as optionally present in the first polymer.

It should be noted that it is possible to separate and/or purify the first polymer before it is used in the process to form the second polymer. However, in a preferred process, the two polymerization steps are concerted. Most preferably the same reactor is used for both the first and the second step, the second step being started by the further addition of monomer to the reaction mixture once a sufficient amount of the first polymer has formed. The exact timing and dosing sequences will depend on, inter alia, the chemicals used and the polymerization conditions applied. Conditions have not been optimized but preferred conditions are considered to be accessible to the skilled person on the basis of the information disclosed herein.

The second emulsion polymerization step can be initiated with free-radical forming initiators selected from those mentioned for the first step, including products such as alkali persulfate, ammonium persulfate, azo-bis-isobutyronitrile, 4,4'-azo-bis-cyanvaleric acid, and organic (hydro)peroxides, such as tertiary butyl hydroperoxide or tertiary butyl perpivalate. The radicals can be formed, for instance, by heating the reaction mixture or by the use of a reducing compound, optionally combined with a metal salt. Reducing compounds are sodium pyrosulfite, sodium formaldehyde sulfoxylate, ascorbic acid, and the like.

The copolymerization of the monomer mixtures is generally carried out under atmospheric pressure at a temperature of 20–100° C., preferably 60–90° C., in an atmosphere of an inert gas, such as nitrogen. If so desired, however, it is also possible to carry out the copolymerization under elevated pressure and at a temperature of 40–100° C. or higher.

The emulsion polymerization process can be carried out as a batch, semibatch, or continuous process. In the case of the batch process, all of the monomers for the production of the second polymer are added to the dispersion of the first polymer. In the case of the semibatch process, the monomers of the second stage polymer are preferably pumped into the reactor containing the first polymer, over a given period of time.

When monomers of drastically different solubility in water or hydrophobicity are used or when a staged monomer addition is used in the synthesis of the second polymer, the polymer particle can exhibit core-shell or gradient morphologies. The use of polymer dispersions with core-shell or gradient morphologies in order to obtain specific properties is well known to those skilled in the art.

In a preferred embodiment of the composition according to the invention, the weight of the first polymer is between 5 and 60% of the weight of the final polymer composition of the second step, and between 40–95% of the weight of the final polymer of the second step is the polymeric material formed in the second step.

After the emulsion polymerization has come to an end a cross-linking compound can be added to the polymer composition to provide cross-linking upon drying of the coating. The moment of addition of this cross-linker is determined by the reactivity of the cross-linker towards the functional groups in the polymer. When the cross-linking reaction is a condensation type of reaction or when the energy needed to start the cross-linking reaction is high, a one-component system can be formulated. When the reactivity is too high, as is the case in some polyaddition types of cross-linking reactions, the cross-linker is added to the polymer composition just prior to its application as a coating.

The following combinations of cross-linkable groups and cross-linkers are particularly useful: a hydroxy group (where this group is comprised in the functional monomer for cross-linking) and a blocked or free polyisocyanate; a hydroxy group and a water-soluble or water-dispersible alkylated amino aldehyde; and a carbonyl group and a polyhydrazide or polyamine.

Cross-linkers that can be used in an ambient curing one-component system are for example a hydrazine-functional agent, preferably a hydrazide-functional agent, more preferably a dihydrazide, e.g., a dicarboxylic acid dihydrazide such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, or terephthalic acid dihydrazide. Alternatively, the cross-linking agent can be a water-soluble aliphatic dihydrazine, such as ethylene-1,2-dihydrazine, propylene-1, 3-dihydrazine, and butylene-1,4-dihydrazine, or a polyamine such as isophorone diamine or 4,7-dioxadecane-1,10-diamine. Preferably, the cross-linking agent is adipic dihydrazide.

To form a composition that cross-links under elevated baking temperatures of about 60–180° C. for about 5–60 minutes, a water-soluble or water-dispersible alkylated amino aldehyde cross-linking agent is preferred. Examples of aminoaldehyde resins are urea-aldehyde, benzoguanamine aldehyde, or melamine-aldehyde condensation products, and the like. Typically, these cross-linking curing agents are the reaction products of melamine or urea with formaldehyde and various alcohols containing up to and including 4 carbon atoms. Particularly preferred cross-linking agents are alkylated melamine-formaldehyde resins. Particularly desired are melamine-formaldehyde condensation products, such as polymethoxymethyl melamines and, preferably, hexamethoxymethyl melamine. Other preferred binders are polymethoxybutyl melamines, preferably with a high degree of butylation. The preferred alkylated melamine formaldehyde resins are commercially available, for example from Akzo Nobel Resins under the trademark Setamine™, from Solutia under the trademark Resimene™, or from Cytec Industries under the trademark Cymel™. Another class of suitable cross-linkers are 1,3,5-triazine-2, 4,6-triscarbamates or oligomers thereof. A suitable example is 2,4,6-tris(butoxycarbonylamino)-1,3,5-triazine, which is available from CYTEC Industries.

Optionally, an acid catalyst, such as paratoluene sulfonic acid, dinonyl-naphthalene disulfonic acid, dinonylnaphthalene monosulfonic acid, or dodecylbenzene sulfonic acid, may be employed to increase the curing rate of the amino aldehyde curing agents with the acrylic resin.

In another embodiment of this invention a two-component system for ambient or forced drying is used. In such a case the cross-linker can be a polyisocyanate cross-linking agent that is added to the polymer composition prior to the application thereof. Examples of polyisocyanates include the biurets or cyclotrimers of hexamethylene diisocyanate; the biurets or cyclotrimers of hexamethylene diisocyanate (for example available from Bayer AG as Desmodur® N 100 and Desmodur® N 3390, respectively); isophorone diisocyanate (e.g. Vestanat® T 1890 from Creanova Inc.); 3,5,5'-trimethyl hexamethylene diisocyanate and isomers thereof; 4,4'-dicyclohexylmethane diisocyanate (Desmodur® W, ex Bayer AG); toluene diisocyanate; 4,4'-diphenylmethane diisocyanate; and tetramethyl xylylene diisocyanate. Further examples include reaction products of polyols (e.g., trimethylol propane) with an excess of a diisocyanate to form isocyanate functional polyurethanes. Optionally, polyisocyanate-functional polyester-urethanes or acrylic-urethanes may also be used.

The isocyanates can be modified with hydrophilic groups to ease incorporation into water. Examples of hydrophilic groups include polyethylene oxide. A commercially available example of such a cross-linker is Bayhydur® N 3100 from Bayer AG. Cure-promoting catalyst can be used in the coating compositions of this invention, as is typical in the art when isocyanate cross-linking or curing agents are employed. Preferred catalysts are organometallics, suitably dibutyl tin dilaurate, zinc octoate, dibutyl tin diacetate, zinc naphthenate, vanadium acetyl acetonate, and zirconium acetyl acetonate, in an effective curing amount, typically from about 0.1 to 2% by weight of binder. The polyisocyanates may optionally be blocked. Examples of suitable blocking agents are materials that unblock at elevated temperatures, for example, lower aliphatic alcohols such as methanol, oximes such as methylethyl ketone oxime, and lactams such as epsilon-caprolactam. Contrary to the unblocked polyisocyanates, blocked isocyanates can be used to form stable one-package systems. At temperatures from 90–160° C. the linkage with the blocking agent is broken, resulting in the regeneration of free isocyanate groups that will react with the polymer composition.

The polymer compositions of the invention are suitable to be used in different types of coating compositions (e.g. protective, decorative or OEM and refinish automotive coatings) on a variety of substrates. They are pre-eminently suited to produce water borne coatings by blending with other suitable components in accordance with normal paint formulation techniques and they are particularly useful as film-forming vehicles in the preparation of water borne coating compositions such as clear coat and base coat compositions useful in automotive applications. Other optional suitable components for use in coating compositions include defoamers, rheology control agents, thickeners, dispersing and stabilizing agents (usually surfactants), wetting agents, fillers, extenders, fungicides, bactericides, coalescing solvents, wetting solvents, plasticizers, anti-freeze agents, waxes and pigments.

Preferably the polymer compositions that are produced in accordance with the invention, and which are useable in the formulation of the coating, adhesive and printink ink compositions, is supplied in the aqueous form. More specifically, the final aqueous second polymer composition preferably is of the form wherein it comprises at least 30, more preferably at least 35 and most preferably at least 40% by weight of the polymer. For ease of handling, the aqueous concentrate comprises at most 99, more preferably at most 75 and most preferably at most 60% by weight of the polymer.

Coating compositions comprising a polymer composition according to the present invention can be applied to various substrates, such as metal, wood, paper, cardboard, gypsum, concrete, plastic, etc. Various known application methods may be used, such as brushing, spraying, rolling, dipping, printing, etc. In particular, a polymeric composition according to the present invention can be used in clear or pigmented coating compositions. As said, other applications of the polymeric compositions according to the present invention is in waterborne printing inks and adhesives.

The invention is further illustrated by the following examples.

EXAMPLE 1

A polymer dispersion was prepared using the composition of Table I. The preparation is described in Table II.

TABLE I

Scheme for emulsion polymerization (amounts in g).

| mixture | compound | g |
|---|---|---|
| A | Demineralized water | 104.2 |
| B | Methacrylic Acid | 5.64 |
|   | Butyl methacrylate | 5.2 |
|   | α-Methylstyrene dimer | 0.83 |
|   | 2-Hydroxyethylmethacrylate | 4.44 |
| C | Butylmethacrylate | 43.4 |
|   | α-Methylstyrene dimer | 3.3 |
|   | 2-Hydroxyethylmethacrylate | 17.76 |
| D | Ammonia 25% | 4.6 |
| E | Trigonox® A-W 70 | 4.6 |
|   | Demineralized water | 25 |
| F | Sodium formaldehyde sulfoxylate | 1.61 |
|   | Demineralized water | 25 |

Trigonox® A-W 70 is a trademark of Akzo Nobel (t-butylhydroperoxide, 70% in water)

TABLE II

Scheme for the preparation:

Procedure for the preparation:
1. Homogenize each of the mixtures of [B], [C], [E], [F]
2. Load in the reactor (round bottom flask) mixture [A]
3. Heat the contents of the reactor to 65° C. under a nitrogen blanket.
4. Subsequently add the mixtures according the following scheme, keeping the temperature at 65° C.:
a.　[B] started at t = 0 dosed till 18 min.
b.　[D] started at t = 0 dosed till 18 min.
c.　[E] started at t = 0, dosed till 1 h and 28 min
d.　[F] started at t = 0, dosed till 1 h and 25 min
e.　[C] started at t = 18 minutes till 1 h and 4 min
f.　Post-reaction till 1 h and 45 min
5. Cool the contents of the reactor to room temperature The resulting fine polymer dispersion had a pH of 6.5, the solids contents were 32.0%, and it was completely free of low molecular weight surfactant and organic solvents. The particle size was determined by means of laser diffraction (a Coulter Counter LS) and was found to be 100 nm.

Preparation of Clear Coat Composition

The following ingredients were stirred together until homogeneity was achieved.

15.0 g of the above polymer dispersion 2.29 g of Cymel® 327 (ex Cytec Industries)

A film of this clearcoat composition was applied onto a Bonder steel panel using a doctor blade. After a 10 min flash-off at room temperature, followed by a 10 min post-drying step at 80° C., the film was cured for 25 min at 140° C. The resulting clear coat film was hard and glossy.

EXAMPLE 2

A polymer dispersion was prepared using the composition of Table III. The preparation is described in Table IV.

TABLE III

Scheme for the emulsion polymerization (amounts in g).

| Mixture | Compound | grams |
| --- | --- | --- |
| A | Demineralized water | 157 |
| B | Methacrylic Acid | 1.53 |
|  | Butyl methacrylate | 11.89 |
|  | α-Methylstyrene dimer | 1.04 |
|  | 2-Hydroxyethyl methacrylate | 5.57 |
| C | Methacrylic Acid | 1.3 |
|  | Butyl methacrylate | 10.97 |
|  | 2-Hydroxyethyl methacrylate | 4.73 |
| D | Butyl methacrylate | 57.7 |
|  | 2-Hydroxyethyl methacrylate | 22.26 |
| E | Ammonium persulfate | 0.25 |
|  | Demineralized water | 15 |
| F | Demineralized water | 3 |
| G | Perkadox AMBN ® | 1.61 |
|  | Demineralized water | 25 |
|  | 1-methoxy-2-propanol | 16.2 |

Perkadox AMBN ® (2,2'-azobis(2-methylbutyronitrile)) is a trademark of Akzo Nobel

TABLE IV

Scheme for the preparation:

Procedure for the preparation:
1. Homogenize each of the mixtures of [B], [C], [E], [F]
2. Load [A] into the reactor (round bottom flask)
3. Apply 3 vacuum/nitrogen flushes at RT
4. Heat the contents of the stirred reactor to 90° C. under a nitrogen blanket.
5. Subsequently add the mixtures according the following scheme, keeping the temperature at 90° C. while stirring the contents of the reactor:
   a. At t = 0 minutes add 3.0 grams of [B] in 40 s
   b. At 1.5 minutes add 11.7 grams of [E], flush the dosing apparatus with [F].
   c. React for 18.5 minutes
   d. Dose [C] and the rest of [E] simultaneously at t = 20 min till t = 50 min
   e. Dose [D] from t = 50 minutes till t = 3 hours 50 minutes.
   f. Dose [G] from t = 50 minutes till t = 4 hours 8 minutes
   g. Post-reaction till t = 4 hours and 23 minutes
6. Cool the contents of the reactor to room temperature The resulting fine polymer dispersion had a pH of 2.7, the measured solids content were 33.2%, and it was completely free of low molecular weight surfactant.

The particle size was determined by means of laser diffraction (a Coulter Counter LS) and was found to be 185 nm.

COMPARATIVE EXAMPLE A

A polymer dispersion was prepared using the composition of Table V. The preparation is described in Table VI. No use was made of α-methylstyrene dimer (AMSD) in any step of the preparation. The amount of AMSD was replaced by an equal amount of butyl methacrylate

TABLE V

Scheme for the emulsion polymerization (amounts in g).

| Mixture | compound | grams |
| --- | --- | --- |
| A | Demineralized water | 157 |
| B | Methacrylic Acid | 1.53 |
|  | Butyl methacrylate | 12.93 |
|  | 2-Hydroxyethyl methacrylate | 5.57 |
| C | Methacrylic Acid | 1.3 |
|  | Butyl methacrylate | 10.97 |
|  | 2-Hydroxyethylmethacrylate | 4.73 |
| D | Butyl methacrylate | 57.7 |
|  | 2-Hydroxyethyl methacrylate | 22.26 |
| E | Ammonium persulfate | 0.25 |
|  | Demineralized water | 15 |
| F | Demineralized water | 3 |
| G | Perkadox AMBN ® | 1.61 |
|  | Demineralized water | 25 |
|  | 1-methoxy-2-propanol | 16.2 |

TABLE VI

Scheme for the preparation:

Procedure for the preparation:
1. Homogenize each of the mixtures of [B], [C], [E], [F]
2. Load in the reactor (round bottom flask) [A]
3. Apply 3 vacuum/nitrogen flushes at RT
4. Heat the contents of the reactor to 90° C. under a nitrogen blanket.
5. Subsequently add the mixtures according the following scheme, keeping the temperature at 90° C. while stirring the contents of the reactor:
   a. At t = 0 minutes add 3.0 grams of [B] in 40 s
   b. At 1.5 minutes add 11.7 grams of [E], flush the dosing apparatus with [F]
   c. React for 20 minutes
   d. Dose [C] and the rest of [E] simultaneously at t = 20 min till t = 50 min
   e. Dose [D] from 50 minutes till 3 hours 54 minutes.
   f. Dose [G] from 50 minutes till 4 hours 6 minutes
   g. Post-reaction till 4 hours and 23 minutes
6. Cool the contents of the reactor to room temperature Although stable seeds can be prepared with this process after step 5c in Table VI, no good control of the emulsion polymerization is possible in the subsequent steps. The formation of large unstable aggregates of polymer particles has been started already during step 5d. Even more aggregates are being formed during step 5e to 5g. The sieve residue according to ISO 4576 was determined by filtration of the dispersion through a 250 mesh sieve and drying the filter residue The sieve residue was found to be 12% (39 grams on 335 grams dispersion). This is completely unacceptable. The rest of the filtered dispersion was very coarse: the particle size was determined by means of laser diffraction (a Coulter Counter LS) and was found to be 460 nm.

EXAMPLE 3

A polymer dispersion was prepared using the composition of Table VII.

TABLE VII

| A | Demineralized water | 770 |
| --- | --- | --- |
| B | α-methyl styrene dimer | 2.1 |
|  | Methacrylic acid | 37.9 |

TABLE VII-continued

| | | |
|---|---|---|
| C | Ammonia (25% aqueous solution) | 29.9 |
| | Demineralized water | 101 |
| D | Sodium persulfate | 1.00 |
| | Demineralized water | 100 |
| E | Methyl methacrylate | 623.5 |
| | 2-ethyl hexyl acrylate | 240.5 |
| | Styrene | 48.0 |
| | Acetoacetoxyethylmethacrylate | 48.0 |
| F | Demineralized water | 200 |
| | Sodium persulfate | 7.0 |
| G | Ammonia (25% aqueous solution) | 5.0 |
| H | Demineralized water | 10 |
| | Trigonox AW-70 | 1.06 |
| I | Demineralized water | 10 |
| | Sodium formaldehyde sulfoxylate | 0.80 |
| J | Ammonia (25% aqueous solution) | 5 |

The following procedure was used. A two liter double jacketed glass reactor equipped with a two-blade stirrer, a condenser, and inlets for addition of monomer pre-emulsions, initiator, and other auxiliaries, was charged with portion A and heated under a nitrogen stream to 90° C. When the temperature of the batch reached 90° C., portions B, C and D were dosed into the reactor simultaneously over a period of 60 minutes. Subsequently the addition of portions E and F was started. Portion E was added in 90 minutes, portion F in 105 minutes. After the additions the batch was kept at 90° C. for an additional 30 minutes. The batch was then cooled to 65° C. The pH of the dispersion is adjusted to 7.5–8.0 using portion G. Solution H was then added to the reactor. After five minutes of mixing I was added to the batch over a period of about 10 to 15 minutes. Finally the pH was adjusted to 9 with portion J. The dispersion was cooled and filtered through a 250 mesh filter screen. The resulting polymer dispersion had a solids content of 43.4% and a pH of 9. The particle size was 289 nm (Z average mean, Malvern Zetasizer) with a polydispersity of 0.24.

EXAMPLE 4

A polymer dispersion was prepared using the composition of Table VIII.

TABLE VIII

| | | |
|---|---|---|
| A | Demineralized water | 808.23 |
| B | Methacrylic acid | 1.85 |
| | Butyl methacrylate | 14.41 |
| | Alpha-methyl-styrene-dimer | 1.26 |
| | 2-Hydroxyethyl methacrylate | 6.75 |
| C | Ammonium persulfate | 1.55 |
| | Demineralized water | 32.33 |
| D | Methacrylic acid | 10.51 |
| | Butyl methacrylate | 88.66 |
| | 2-Hydroxyethylmethacrylaat | 38.23 |
| E | Butyl acrylate | 185.08 |
| | 2-Hydroxyethyl methacrylate | 72.74 |
| | Methyl methacrylate | 387.14 |
| F | Ammonium persulfate | 3.70 |
| | Demineralized water | 323.29 |
| G | Demineralized water | 24.25 |

A two liter double jacketed glass reactor equipped with a two-blade stirrer, a condenser, and inlets for addition of monomer pre-emulsions, initiator, and other auxiliaries, was charged with portion A and heated under a nitrogen stream to 90° C. When the temperature of the batch reached 90° C., portions that were mixed in advance were pumped into the reactor. After five minutes of mixing C was pumped into the reactor and reacted for 20 minutes. Then portion D was dosed into the reactor in 30 minutes, immediately followed by portion E. Dosing of portion F to the reactor was started together with the addition of portion D and ended when all of portion E was dosed into the reactor. Portion G was used for rinsing the monomer en initiator tanks. The batch was held at 90° C. for an additional 30 minutes before it was cooled down and the pH was adjusted to a value of 8. The solids content of the dispersion was found to be 40%. Particle size (Malvern Zetasizer, Z-average mean) is 245 nm.

COMPARATIVE EXAMPLE B AND EXAMPLE 5

These examples are conducted to demonstrate that at least 70% of all ethylenically unsaturated bonds of the monomers of step a) of the process must be of methacrylic nature in order to ensure that the polymer of the first step can react with the monomers in the second step. For this purpose various monomer mixtures were subjected to just step a) and analyzed. More specifically, in example B the following mixtures were made:

| Part | Name | Grams |
|---|---|---|
| A | Butyl methacrylate | 7.34 |
| | Butylacrylate | 14.10 |
| | Methacrylic acid | 3.71 |
| | 2-hydroxyethylmethacrylate | 3.01 |
| | Alpha-methyl-styrene-dimer | 24.48 |
| B | Butyl methacrylate | 65.50 |
| | Butylacrylate | 127.55 |
| | Methacrylic acid | 33.37 |
| | 2-hydroxyethylmethacrylate | 28.70 |
| C | 1-methoxy-2propanol | 133.20 |
| | Perkadox AMBN | 4.59 |

In Example 5 the same mixtures were made except that butylmethacrylate was substituted for the butylacrylate.

The experiment was carried out in a 4 necked round bottom reaction flask fitted with a stirrer, a thermometer (Pt-100), a reflux condenser and dropping funnel/automatic dosage controllers. The round bottom flask was heated by a heating mantle and the temperature was controlled by a Julabo LC3-apparatus. The reactions were carried out on 0.5-liter scale under a static blanket of nitrogen after a vacuum/nitrogen flushing procedure (for more details see the recipes). The stirring speed was 300 RPM. The polymerization was conducted as follows:

| Example | Mw | Mn | Mz | Pd |
|---|---|---|---|---|
| B | 8061 | 3505 | 14971 | 2.30 |
| 5 | 5288 | 3064 | 7788 | 1.73 |

1. Homogenize parts A, B and C
2. Preload part A
3. Apply the vacuum/N2 cycle three times to create an oxygene free reaction vessel at RT. Keep the N2 blanket present after this for the rest of the reaction.
4. Heat to 130° C.
5. At this temperature, add parts B and C:
   Part B added during 6 hrs 01 minutes
   Part C added during 6 hrs 16 minutes
6. Post react the content of the rector till 6 hrs 25 minutes
   After the reaction the reaction mixture is cooled to 25° C. with a water/ice bath The reactions resulted in clear, colorless viscous resins that were analyzed for molecular weight by SEC determination (RI and UV(254 nm) detection) using polystyrene standards and H-NMR in D6DMSO, with the following results:

TABLE IX

Monomer mixture in grams for polymer A

| | |
|---|---|
| Butyl methacrylate | 56.5 |
| Methyl methacrylate | 56.5 |
| Diacetone acrylamide | 5.9 |
| Methacrylic acid | 31.4 |

Clearly the product of Example 5 has a desirably lower molecular weight and also a much more narrow molecular weight distribution (SEE Pd). The NMR analysis showed that in both experiments all the α-methyl styrene dimer had reacted. The product of example B did not contain a detectable amount of terminal unsaturated carbon carbon bonds. In the product of example 5, however, terminal unsaturated carbon carbon bonds were present in a molar amount corresponding to 85+/-5% of the number of moles of α-methyl styrene dimer that was used. The polymer of example 5 can be used in a subsequent emulsion polymerization step to complete the process of the invention.

EXAMPLE 6

A first polymer (polymer A) was synthesized as follows:
a monomer-mixture was prepared by mixing the ingredients in table IX.

TABLE X

Pre-emulsion in grams for polymer B.

| | |
|---|---|
| Polymer A | 91.8 |
| Demineralized water | 274.5 |
| Ammonia (25%) | 10.5 |
| Styrene | 57.3 |
| 2-Ethyl hexyl acrylate | 72.0 |
| Methyl methacrylate | 72.6 |
| Methacrylic acid | 7.0 |
| PLEX 6844-0 ™ (*) | 13.8 |
| Diacetone acrylamide | 7.0 |

(*) a 25% solution of ethylene ureum ethylmethacrylate in methyl methacrylate, ex Röhm.

In a 250 ml reaction-flask a mixture was charged of 22.5 g of α-methylstyrene dimer and 15 g of the above monomer mixture. The content of the flask was heated to 100° C. under a nitrogen blanket. Subsequently, the remainder of the monomer mixture and a solution of 3 g of Trigonox® 121 (ex Akzo Nobel) in 64.29 g of Dowanol® PM (ex Dow Chemical Company) were metered into the reaction flask in 240 and 270 min, respectively. The resulting product was a clear highly viscous resin solution with a solids content of 75%.

The polymer was analyzed using gel permeation chromatography. Mn=3173 and Mw=7096. NMR analysis revealed that the polymer contains a terminal double bond.

Emulsion polymerization of polymer B in the presence of a solution of the first polymer.

39.32 g of polymer A was dissolved in 115.1 g of demineralized water and 5 g of a 25% ammonia solution and charged in a polymerization reactor. The content was heated to 90° C. under a nitrogen blanket.

A pre-emulsion was prepared by mixing the ingredients given in Table X.

TABLE XI

Total monomer mixture for polymer A in g:

| | |
|---|---|
| Butyl methacrylate | 218.4 |
| Methacrylic acid | 38.0 (9.5 + 28.5) |
| 2-Hydroxyethylmethacrylate | 30.61 |

The pre-emulsion was dosed into the reactor over a period of 180 min while the temperature was maintained at 90° C. Simultaneously, the addition of a solution of 0.63 g of sodium persulfate in 45.7 g of demineralized water was started. This solution was dosed into the reactor over a period of 195 min. The container for the pre-emulsion was rinsed with 14.3 g of demineralized water, the container for the initiator solution with 3 g of demineralized water. After the end of the additions the batch was kept at 90° C. for 30 min. The batch was then cooled to 65° C. The pH of the polymer dispersion was adjusted to 7–7.5 with 3 g of a 25% aqueous ammonia solution.

When the temperature of the batch reached 65° C., 0.4 g of tertiary butyl hydro-peroxide (70%) were added and mixed for 10 min. A solution of 0.17 g of sodium formaldehyde sulfoxylate in 7 g of demineralized water was prepared and added to the reactor over a period of 30 min. The container and the feed-lines were rinsed with 3 g of demineralized water and the batch was kept at 65° C. for an additional 30 min. Then 7 g of adipic dihydrazide was added to the polymer dispersion under mixing. After 30 min the batch was cooled to 30° C. and 0.86 g of Proxel® XL-2, a biocide from Avecia, was added to the dispersion.

The resulting polymer dispersion had a pH of 7.1. Particle size was determined by means of photon correlation spectroscopy and was found to be 70 nm (mean diameter based on the intensity of scattered light) with a polydispersity of 0.06. A film of the polymer dispersion of Example 6 was applied onto a glass plate using a doctor blade. The film dried to a clear hard and glossy coating.

EXAMPLE 7

A first polymer (polymer A) was synthesized as follows:
A monomer-mixture was prepared by mixing the ingredients of Table XI.

TABLE XII

Scheme for polymer B (amounts in g).

| Ingredients | Monomer (feed A) | Stabilizer (feed B) | initiator solution (feed C) |
|---|---|---|---|
| Methyl methacrylate | 30.4 | — | — |
| Butyl methacrylate | 60.8 | — | — |
| 2-Hydroxyethyl methacrylate | 43.8 | — | — |
| STABMIX | — | 135.02 | — |
| Demi-water | — | 23.8 | — |
| Perkadox ® AMBN | — | — | 2.03 |
| Dowanol ® PM | — | — | 39.1 |
| Demi-water | — | — | 19.5 |

In a 500 ml reaction-flask a mixture was charged of 43 g of α-methylstyrene dimer, 9.5 g of methacrylic acid and 60.5 g of Dowanol® PM (ex Dow Chemical Company) The content of the flask was heated to 100° C. under a nitrogen blanket. Subsequently, the remainder of the monomer mixture, being 28.5 g of methacrylic acid, 218.4 g of butyl methacrylate, and 30.61 g of 2-hydroxyethylmethacrylate, and separately a solution of 4.95 g of Perkadox® AMBN (ex Akzo Nobel) in 76 g of Dowanol® PM (ex Dow Chemical Company) were metered into the reaction flask in 3 and 3.5 h, respectively.

The resulting product was a clear highly viscous resin solution with a solids content of 71%. The polymer was analyzed using gel permeation chromatography. Mn=2010 and Mw=6123. NMR analysis revealed that the polymer contained a terminal double bond.

Emulsion polymerization of polymer B in the presence of a solution of the first polymer:

171.51 g of polymer A was dissolved in 25.83 g of a 50% N,N-dimethylethanol amine solution in water and diluted with 403.2 g of demineralized water in a mixing reactor. 33.25 g from this stabilizer mixture (STABMIX) and 33.75 g of demineralized water were charged in a polymerization reactor. The content was heated to 87° C. under a nitrogen blanket. A multi-dosage feed scheme was set up prepared by mixing the ingredients given in Table XII.

TABLE XIII

Total monomer mixture for polymer A in g:

| | |
|---|---|
| Butyl methacrylate | 218.4 |
| Methacrylic acid | 38.0 (9.5 + 28.5) |
| 2-Hydroxyethylmethacrylate | 30.61 |

Feeds A and B were dosed in 3 h simultaneously, while Feed C was dosed in 3.5 h, while the temperature was maintained at 87° C. After the end of the additions the batch was kept at 87° C. for 30 min, and then cooled to room temperature.

The resulting polymer dispersion had a pH of 8.36 and the solids contents were 40.0%. Particle size was determined by means of laser diffraction (a Coulter Counter LS) and was found to be 154 nm (mean) with a S.D. of 4 nm.

Preparation of Clearcoat Composition

The following ingredients were stirred together until homogeneity to obtain a clear coat composition 15 g of the above polymer dispersion 4.70 g of Desmodur® N3100 (ex Bayer)

A film of the polymer dispersion was applied onto a glass plate using a doctor blade. After a 10 min flash-off at room temperature, followed by a 10 min post-drying step at 80° C., the film was cured for 25 min at 140° C. The resulting clear coat film was hard and glossy.

This clear coat composition is particularly useful as a WB 2K ambient/forced dry/stoving composition for vehicle refinish and automotive applications.

EXAMPLE 8

A first polymer (polymer A) was synthesized as follows:

A monomer-mixture was prepared by mixing the ingredients in Table XIII.

TABLE XIV

Scheme for polymer B (amounts in g).

| Ingredients | monomer (feed A) | stabilizer (feed B) | initiator solution (feed C) |
|---|---|---|---|
| Methyl methacrylate | 30.4 | — | — |
| Butyl methacrylate | 60.8 | — | — |
| 2-Hydroxyethyl methacrylate | 43.8 | — | — |

TABLE XIV-continued

Scheme for polymer B (amounts in g).

| Ingredients | monomer (feed A) | stabilizer (feed B) | initiator solution (feed C) |
|---|---|---|---|
| STABMIX | — | 135.02 | — |
| Demi-water | — | 23.8 | — |
| Perkadox ® AMBN | — | — | 2.03 |
| Dowanol ® PM | — | — | 39.1 |
| Demi-water | — | — | 19.5 |

In a 500 ml reaction-flask a mixture was charged of 43 g of α-methylstyrene dimer, 9.5 g of methacrylic acid and 60.5 g of Dowanol® PM (ex Dow Chemical Company). The content of the flask was heated to 100° C. under a nitrogen blanket. Subsequently, the remainder of the monomer mixture, being 28.5 g of methacrylic acid, 218.4 g of butyl methacrylate and 30.61 g of 2-hydroxyethyl-methacrylate, and separately a solution of 4.95 g of Perkadox® AMBN (ex Akzo Nobel) in 76 g of Dowanol® PM (ex Dow Chemical Company) were metered into the reaction flask in 3 and 3.5 h, respectively. The resulting product was a clear highly viscous resin solution with a solids content of 71%. The polymer was analyzed using gel permeation chromatography. Mn=2010 and Mw=6123. NMR analysis revealed that the polymer contained a terminal double bond.

Emulsion polymerization of polymer B in the presence of a solution of the first polymer:

171.51 g of polymer A was dissolved in 25.83 g of a 50% N,N-dimethylethanol-amine solution in water and diluted with 403.2 g of demineralized water in a mixing reactor. 33.25 g of this stabilizer mixture (STABMIX) and 33.75 g of demineralized water were charged in a polymerization reactor. The content was heated to 87° C. under a nitrogen blanket. A multi-dosage feed scheme was set up prepared by mixing the ingredients given in Table XIV.

TABLE XV

Scheme for the emulsion polymerization (amounts in g).

| Mixture | Compound | g |
|---|---|---|
| A | Demineralized water | 104.2 |
| B | Methacrylic Acid | 5.64 |
|   | Butyl methacrylate | 5.2 |
|   | α-Methylstyrene dimer | 0.83 |
|   | 2-Hydroxyethylmethacrylate | 4.44 |
| C | Butylmethacrylate | 43.4 |
|   | α-Methylstyrene dimer | 3.3 |
|   | 2-Hydroxyethylmethacrylate | 17.76 |
| D | Ammonia 25% | 4.6 |
| E | Trigonox ® A-W 70 | 4.6 |
|   | Demineralized water | 25 |
| F | Sodium formaldehyde sulfoxylate | 1.61 |
|   | Demineralized water | 25 |

Trigonox ® A-W 70 is a trademark of Akzo Nobel (t-butylhydroperoxide, 70% in water)

Feeds A and B were dosed in 3 h simultaneously, while Feed C was dosed in 3.5 h, while the temperature was maintained at 87° C. After the end of the additions the batch was kept at 87° C. for 30 minutes, and thereafter cooled to room temperature. The resulting polymer dispersion had a pH of 8.36 and the solids content was 40.0%. Particle size was determined by means of laser diffraction (a Coulter Counter LS) and was found to be 154 nm (mean) with a S.D. of 4 nm.

Preparation of Clearcoat Composition

The following ingredients were stirred together until homogeneity.

20 g of the above polymer dispersion
3.83 g of Cymel® 327 (ex Cytec Industries).

A film of the composition II was applied onto a glass plate using a doctor blade. After a 10 min flash-off at room temperature, followed by a 10 min post-drying step at 80° C., the film was cured for 25 min at 140° C. The resulting clearcoat film was hard and glossy.

EXAMPLE 9

A polymer dispersion was prepared using the composition of Table XV. The preparation is described in Table XVI.

TABLE XVI

Scheme for the preparation:

Procedure for the preparation:
1. Homogenize each of the mixtures of [B], [C], [E], [F]
2. Load in the reactor (round bottom flask) mixture [A]
3. Heat the contents of the reactor to 65° C. under a nitrogen blanket.
4. Subsequently add the mixtures according the following scheme, keeping the temperature at 65° C.:
    a. [B] started on t = 0 dosed till 18 min.
    b. [D] started on t = 0 dosed till 18 min.
    c. [E] started on t = 0, dosed till 1 h and 28 min
    d. [F] started on t = 0, dosed till 1 h and 25 min
    e. [C] started on t = 18 minutes till 1 h and 4 min
    f. Post-reaction till 1 h and 45 min
5. Cool the contents of the reactor to room temperature The resulting fine polymer dispersion had a pH of 6.5, the solids content was 32.0%, and it was completely free of low molecular weight surfactant and organic solvents. Particle size was determined by means of laser diffraction (a Coulter Counter LS) and was found to be 100 nm.

Preparation of Clear Coat Composition

The following ingredients were stirred together until homogeneity was achieved.

15.0 g of the above polymer dispersion
2.29 g of Cymel® 327 (ex Cytec Industries)

A film of this clear coat composition was applied onto a Bonder steel panel using a doctor blade. After a 10 min flash-off at room temperature, followed by a 10 min post-drying step at 80° C., the film was cured for 25 min at 140° C. The resulting clear coat film was hard and glossy.

EXAMPLE 10

A polymer dispersion as was prepared using the composition of Table XVII.

TABLE XVII

| | | |
|---|---|---|
| A | Demineralized water | 700 |
| | Ammonia (25% aqueous solution) | 3.8 |
| B | Methacrylic acid | 4.830 |
| | Butyl methacrylate | 12.18 |
| | Alpha-methyl-styrene-dimer | 37.50 |
| | methylmethacrylate | 5.99 |
| C | Ammonium persulfate | 1.550 |
| | Demineralized water | 32.33 |
| D | Methacrylic acid | 100 |
| | Butyl methacrylate | 252.1 |
| | Methyl methacrylate | 123.8 |
| E | Ammonium persulfate | 2 |
| | Demineralized water | 100 |
| F | Ammonium persulfate | 0.5 |
| | Demineralized water | 10 |
| G | Ammonia (25% aqueous solution) | 32.5 |

A two liter double jacketed glass reactor equipped with a two-blade stirrer, a condenser, and inlets for addition of monomer pre-emulsions, initiator, and other auxiliaries, was charged with portion A and heated under a nitrogen stream to 90° C. When the temperature of the batch reached 90° C., portion B that was mixed in advance was pumped into the reactor. After five minutes of mixing C was pumped into the reactor and reacted for 30 minutes. Portions D and E were pre-mixed and dosed into the reactor in 60 minutes. The batch was kept at 90° C. for 90 minutes. Afterwards portion F was added and the batch was kept at 90° C. for an additional 90 minutes.

The batch was cooled down and the pH was adjusted with portion G. The content of the reactor was filtered and stored into a suitable container. The dispersion obtained had a solids content of 38% and a pH of 6.5. Particle size (Malvern Zetasizer, Z-average mean) was 151 nm.

Preparation of Varnish 430.7 grams of the dispersion prepared above was charged in a two liter double jacketed glass reactor equipped with a two-blade stirrer, a condenser, and inlets for addition of monomer pre-emulsions, initiator, and other auxiliaries. Under a nitrogen sparge the content of the reactor was heated to 90° C. 469.8 grams of demineralized water and 24.8 grams of a 25% strength aqueous solution of ammonia were added to the reactor. 381.9 grams of styrene and a solution of 1 gram of ammonium persulfate in 100 grams of water were dosed into the reactor over a period of 90 minutes. During the addition 468 grams of demineralized water was added to compensate for the increase in viscosity. After completion of the additions the batch was held at 90° C. for 60 minutes. The batch was then cooled to 65° C. and 8.1 grams of a 16% strength solution of tertiary butyl hydroperoxide in demineralized water was added to the reactor. A solution of 0.8 grams of sodium formaldehyde sulfoxylate in 10.8 grams of demineralized water was then dosed into the reactor over a period of 10 minutes. The batch was kept at 65° C. for 30 minutes and then cooled and filtered. The resulting polymer dispersion had a solids content of 29% and a pH of 8.7. Particle size (Malvern Zetasizer, Z-average mean) was 84 nm. The resulting polymer dispersion was formulated in a simple overprint varnish containing 5% (on dispersion) Aquacer 531 and 6% (on dispersion) Dowanol® DPM. This overprint varnish was drawn down on a Leneta chart. Film-formation was good and the gloss measured at 60° was 95 gloss units. When exposed to water the varnish exhibited a pronounced water-beading effect.

What is claimed is:

1. A polymerization process which includes the steps of:

(a) polymerizing a mixture of ethylenically unsaturated monomers, at least 70% of all ethylenically unsaturated bonds of the monomers being of a methacrylic nature, in the presence of one or more chain transfer agents of the formula,

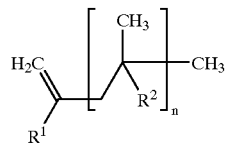

wherein $R^1$ and, if present, each $R^2$ are, independently, the same or different and selected from conventional radical stabilizing groups, n is, on average, 0–10, said chain transfer angents being substantially free of cobalt chelate complexes, to form a first polymer with unsaturated carbon-carbon end groups, said first polymer being essentially free of organic solvents and said monomers being selected such that the first polymer is water-soluble or water-dispersible; and (b) aqueous emulsion polymerizing a mixture comprising ethylenically unsaturated monomers in the presence of the first polymer and in the substantial absence of surfactant to form a dispersion of a water-insoluble second polymer.

2. The process of claim 1 wherein at least one chain transfer agent is an α-methylstyrene dimer.

3. The process of claim 1 wherein step (a) and step (b) are each performed in the absence or substantial absence of surfactants.

4. The process of claim 1 wherein one or more of the monomers of steps (a) and/or (b) comprise cross-linkable groups.

5. The process of claim 4 wherein the cross-linkable groups are selected from the group consisting of acid groups or hydroxy groups.

6. The process of claim 4 wherein the monomer comprising cross-linkable groups is present in step (a).

7. The process of claim 6 wherein the monomer is selected from the group consisting of methacrylic acid or acrylic acid.

8. The process of claim 1 wherein the weight of the first polymer is between about 5%–60% of the weight of the water-insoluble second polymer.

9. The process of claim 1 comprising a third step (c) wherein a cross-linking compound is added to the dispersion of step (b).

* * * * *

UNITED STATES PATENT AND TRADEMARK OFFICE
CERTIFICATE OF CORRECTION

PATENT NO. : 6,872,789 B2  
DATED : March 29, 2005  
INVENTOR(S) : Richard Hendrikus Gerrit Brinkhuis et al.

It is certified that error appears in the above-identified patent and that said Letters Patent is hereby corrected as shown below:

Title page,  
Item [73], Assignee, delete "Arnehm" and insert -- Arnhem --.

Column 22,  
Line 64, delete "angents" and insert -- agents --.

Signed and Sealed this

Nineteenth Day of July, 2005

JON W. DUDAS  
*Director of the United States Patent and Trademark Office*